United States Patent

Mickeler et al.

Patent Number: 5,225,986
Date of Patent: Jul. 6, 1993

[54] IGNITING DEVICE FOR PROTECTIVE DEVICES IN VEHICLES

[75] Inventors: Reinhold Mickeler, Holzgerlingen; Alban Bossenmaier, Gäufelden; Volker Petri, Aidlingen, all of Fed. Rep. of Germany

[73] Assignee: Daimler-Benz Aktiengesellschaft, Fed. Rep. of Germany

[21] Appl. No.: 863,478

[22] Filed: Apr. 2, 1992

Related U.S. Application Data

[63] Continuation of Ser. No. 537,126, Jun. 13, 1990, abandoned.

[30] Foreign Application Priority Data

Jun. 14, 1989 [DE] Fed. Rep. of Germany ....... 3919376

[51] Int. Cl.⁵ ............................................ B60R 21/16
[52] U.S. Cl. .............................. 364/424.05; 340/436; 307/10.1; 280/735; 180/271
[58] Field of Search ................... 364/424.05; 340/436, 340/438; 307/9.1, 10.1; 180/271, 274, 282; 280/728, 730, 734, 735

[56] References Cited

U.S. PATENT DOCUMENTS

| | | | |
|---|---|---|---|
| 3,870,894 | 3/1975 | Brede et al. | 180/274 |
| 3,931,527 | 1/1976 | Oishi et al. | 280/735 |
| 3,980,318 | 9/1976 | Balban | 280/735 |
| 4,346,913 | 8/1982 | Schrauf et al. | 180/282 |
| 4,673,912 | 6/1987 | Kumasaka et al. | 280/735 |
| 4,723,078 | 2/1988 | Neuffer et al. | 340/436 |
| 4,893,109 | 1/1990 | Vrabel et al. | 280/735 |
| 4,933,570 | 6/1990 | Swart et al. | 280/735 |
| 4,968,965 | 11/1990 | Naitou et al. | 280/735 |

FOREIGN PATENT DOCUMENTS

2942252 12/1980 Fed. Rep. of Germany .

Primary Examiner—Gary Chin
Attorney, Agent, or Firm—Evenson, McKeown, Edwards & Lenahan

[57] ABSTRACT

An igniting device for protective devices in vehicles has a pyro-electric igniting element which is associated with an electronic lock and a controlled switch for releasing the application of current to the igniter, and can be combined in an integral component. The application of an igniting signal leads to current being applied to the igniting element only after transmission of an unlocking signal to reliably prevent an unwanted triggering of ignition, for example by accidental application of an external voltage to the connections of the igniting device. The reactive igniting substance can be directly connected to a silicon chip which monolithically implements the electronic lock and the controlled switch.

26 Claims, 2 Drawing Sheets

IGNITING DEVICE FOR PROTECTIVE DEVICES IN VEHICLES

This is a continuation of application Ser. No. 07/537,126, filed Jun. 13, 1990 now abandoned.

BACKGROUND AND SUMMARY OF THE INVENTION

The present invention relates to an igniting device for protective devices in vehicles having a pyro-electric igniting element which contains a fusible conductor which can be heated by current flow and an inflammable material which is in thermal contact with the fusible conductor, and having at least two igniting connections.

In motor vehicles, pyro-electric igniting elements are provided for triggering protective devices, such as, for example, belt-tightening or airbag systems. These igniting elements contain low-resistance fusible wire links and a chemical inflammable material which encloses or embeds the wire links. If sufficient current flows through the fusible wire, it heats to a temperature at which the inflammable material is ignited.

These igniting elements have the disadvantage that they can be ignited even with the application of relatively low voltages. For instance, ignition can occur by circuit checkers accidentally slipping on the feed wires incorrectly or by applying the vehicle voltage in the course of negligent manipulation. In the event of an undesired triggering of an airbag, the consequence can be damage to property or an accident.

It is therefore an object of the present invention to provide a simple igniting device which does not exhibit these disadvantages and offers high inherent safety with respect to unwanted ignition triggering.

This and other objects are achieved in an igniting device for protective devices in vehicles constructed in accordance with the present invention, which comprises a pyro-electric igniting element which contains a fusible conductor that can be heated by current flow and an inflammable material which is in thermal contact with the fusible conductor. The igniting device has at least two igniting connections coupled to the pyro-electric igniting element, an electrically controllable switch having a contact gap and a control input, this contact gap being connected in series with the fusible conductor, and an electronic lock. The electronic lock has an input and an output, the electronic lock output being coupled to the control input of the switch, which is actuated by the electronic lock to close the contact gap when an unlocking signal is received at the electronic lock input and at least by the time an igniting signal provided for activating the fusible conductor has been applied to the igniting device.

The actual pyro-electric igniting element, the switching component which is connected in series with the igniting element, and the electronic lock for applying current to the igniting element can all be combined in an integral component according to an embodiment of the present invention.

Current can only be applied to the pyro-electric igniting element if, when an igniting signal is present at the igniting device having these characteristics, an additional unlocking signal was already present and "opened" the electronic lock.

The device according to the invention thus offers very high safety with respect to mistriggering, since two signals required for the triggering of the igniting element must be present at the igniting device according to the invention in order to make its operation possible at all.

In certain embodiments of the invention, the time characteristic of the unlocking signal is coded in a manner effecting the opening of the electronic lock. The unlocking signal can be supplied to the igniting device independently of the igniting signal, line-conducted or not line-conducted or together with the igniting signal.

For opening the electronic lock, the unlocking signal can contain, for example, a code in the form of a certain pulse sequence (digital code). The electronic lock can also respond to a code frequency.

To supply both the electronic lock and the switching element with operating power, at least one, and preferably both igniting lines can be used. In addition, the reactive inflammable substance can be directly connected to a silicon chip implementing the electronic lock. In this case, for example, a bonding wire which is present in any case and may be specially formed out and/or run can also be provided as fusible wire link.

Other objects, advantages and novel features of the present invention will become apparent from the following detailed description of the invention when considered in conjunction with the accompanying drawings.

DETAILED DESCRIPTION OF THE DRAWINGS

Figure 1:
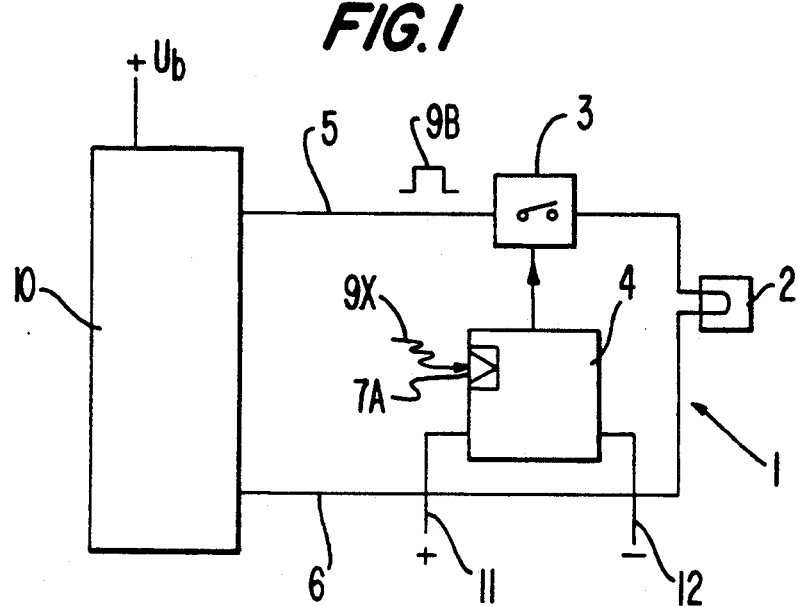
FIG. 1 shows an igniting device constructed according to an embodiment of the present invention having independent actuating capability via an unlocking and igniting signal.

According to FIG. 1, the igniting device 1 according to the present invention comprises at least the actual pyro-electric igniting element 2, an electronic lock 4 with unlocking input 7A and an electric switch 3 which can be actuated by this lock. The electronic lock 4 is supplied with operating power via lines 11 and 12. The input 7A can be electric, optical, a radiofrequency or an input responding to particular soundwaves. The input 7A can receive, line-conducted or not line-conducted, an unlocking signal 9X. The discrimination or decoding of this unlocking signal 9X in the electronic lock 4 effects the opening of the switch 3 for an igniting signal 9B via lines 5 and 6 from the ignition triggering control circuit 10. The electronic lock 4 can be, for example, a "digital" lock, in other words, one which responds to particular pulses and their duration and/or sequence or one which responds to a particular frequency of an alternating quantity present.

Figure 2:
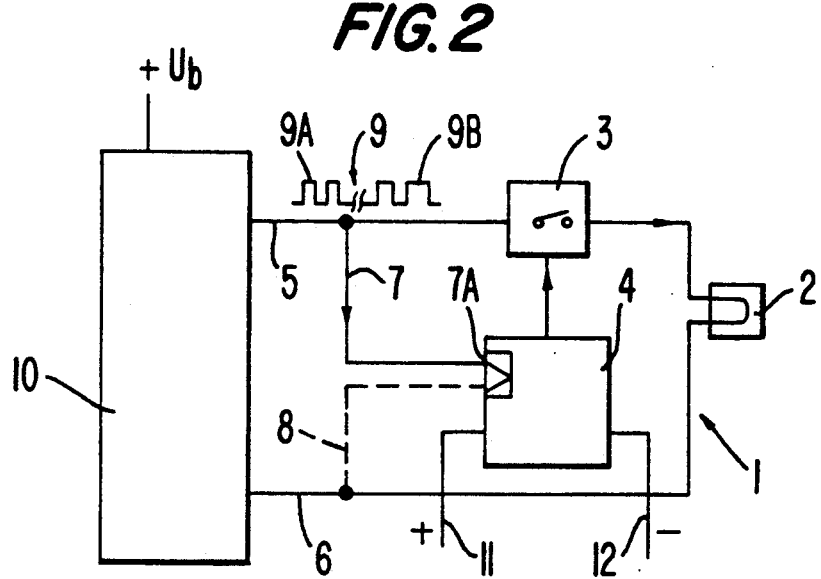
FIG. 2 shows an igniting device constructed according to an embodiment of the present invention with a current supply for the electronic lock.

In the following description, a digital implementation is assumed with reference to the illustrative embodiment according to FIG. 2. The pyro-electric igniting element 2 has two igniting lines 5 and 6, an electrically controllable switch 3 being inserted into one of the lines, here into line 5. When the switch 3 is closed, a current can be applied to the pyro-electric igniting element 2 from a control circuit 10 via the igniting lines 5 and 6. The control circuit 10 can be, for example, a triggering device for a belt tightener or an airbag. At the switch 3, which is initially open, the electronic lock 4 can receive via its input 7A and a receiving line 7, an unlocking signal from line 5 in the form of a serial pulse code 9 which is output to the line 5 by the control circuit 10 for activating the pyro-electric igniting element 2. If the unlocking part 9A of the received serial signal or pulse code 9 corresponds to the specific response code of the electronic lock 4, the electronic lock 4 actuates the switch 3 so that the switch 3 closes. After the closing of the switch 3, further signal components 9B of the pulse code 9 can be applied to the pyro-electric igniting element 2. For example, the last (that is to say a single) transmitted bit 9B of the serial signal 9 on line 5 can have the required length in time ("long bit") for supplying a current integral to the igniter 2 which is adequate for sufficiently heating a fusible wire link.

One or more current-application pulses 9B can have the same or a different amplitude from the previous pulses for opening the electronic lock 4. For example, the last bit(s) 9B provided for applying current to the pyro-electric igniting element 2 can be made available from a voltage source having a particularly low internal resistance in the control circuit 10 while the code pulses 9A can originate from a different source in the control circuit 10 up to the closing actuation of the switch 3.

For a frequency-dependent responding electronic lock 4, a combined unlocking and igniting signal output by the control circuit 10 can comprise an alternating voltage or an alternating current of predetermined frequency. This signal is switched through to the pyro-electric igniting element 2 only when a discriminator has detected a correspondence of the frequency with a response or reference frequency or period duration stored in the electronic lock 4. For this purpose, the electronic lock 4 would preferably contain a comparison circuit which compares at least one time constant which is defined in internal software or hardware with the period duration of an applied igniting signal for correspondence within certain permitted error limits.

The controllable switch 3 can be a bipolar or MOS transistor, a thyristor or also a relay. The dashed connection 8 in FIG. 2 symbolizes a reference potential bridge for the input circuit 7A which evaluates the unlocking signal 9A, of the electronic lock 4 if this lock 4 is supplied, as shown here, via separate operating supply connections 11 and 12 from a separate operating voltage which is not connected to the control device 10.

Figure 3:
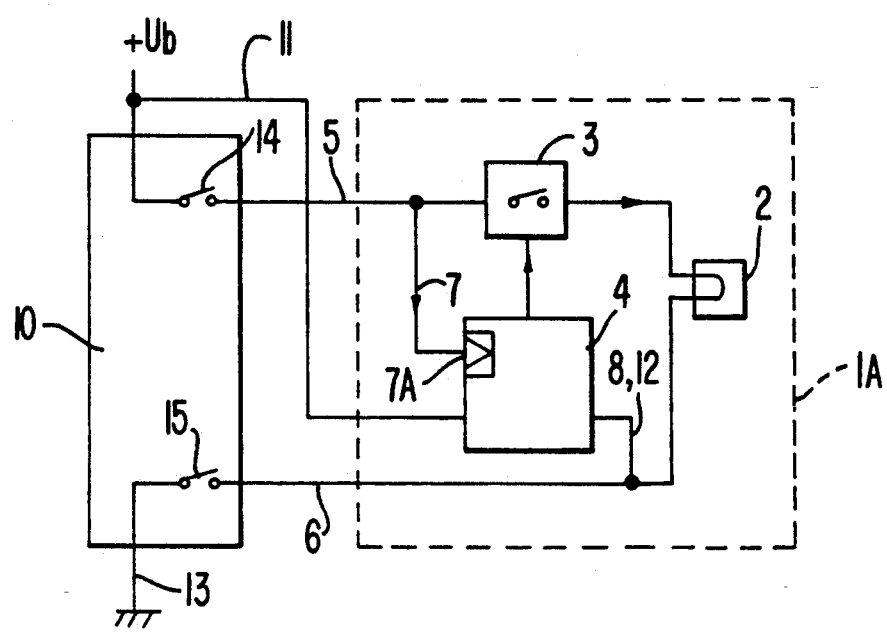
FIG. 3 shows another embodiment of an igniting device according to the present invention which can be operated at a conventional control device output and also uses one of the two igniting lines of the igniting element for obtaining its operating power.

According to the embodiment of FIG. 3, it is also possible for one of the two igniting lines 5,6 to be used for supplying power to the electronic lock 4 of an igniting device 1A, that is preferably constructed in a single case. This embodiment is suitable for use, for example, in a passenger protection device in a motor vehicle. In control devices for airbag or belt tightener triggering, the igniting lines 5 and 6 are, as a rule, disconnected at the rest state, that is to say when they do not carry any potential. For activation, a mechanically operated switch 15 couples the pyro-electric igniting element 2 via the line 6 to the first pole of the vehicle network, for example to ground 13. At the same time, an electronic switch 14 which is actuated by an evaluating circuit, not shown, in the control circuit 10 connects the pyro-electric igniting element 2 via the line 5 to the second pole $+U_b$ of the vehicle network.

To this extent, the electronic lock 4, and thus also the control circuit of the switch 3, is supplied with current by a third line 11 which is permanently coupled to the second pole $+U_b$ of the vehicle voltage supply. For this purpose, both the reference potential for the unlocking code to be received and the operating current of the electronic lock 4 are obtained via a common connection 812 of the electronic lock 4 from the groundside igniting line 6. In other words, the reference potential and the operating current are obtained as soon as the igniting line 6 is connected to ground via the mechanically activatable switch 15 in the control device 10. A prompt operational readiness of the electronic lock 4 is guaranteed when it is ensured that the mechanically operated switch 15 closes in each case before the switch 14, which is generally the case with this conventional type of control device 10. With this prerequisite, the electronic lock 4 is already ready for reception when the first unlocking signal component arrives.

Figure 4:
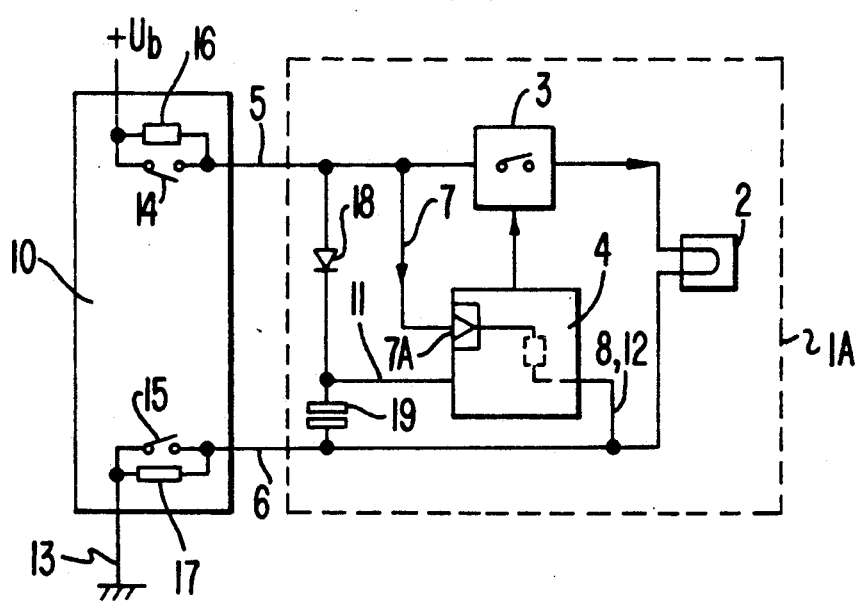
FIG. 4 shows another embodiment of an igniting device according to the present invention which can be operated at a modified control device output and obtains its operating power via both igniting lines of the igniting element.

FIG. 4 illustrates another embodiment of an igniting device 1A constructed according to the present invention. The electronic lock 4 is here supplied with the necessary operating power via both igniting lines 5 and 6. This can be done in three different ways.

In the first way, the switches 14 and 15 are bypassed by high-resistance resistors 16 and 17. They are dimensioned in such a manner that, although a current required for ignition cannot flow when switches 14 and 15 are opened, an adequate static operating current can flow in order to supply the circuit of the electronic lock 4 (for example constructed in CMOS technology of very low current consumption) with operating current. However, the circuit of the electronic lock 4 can have at the instant of actuation of the switch 3 a higher current requirement than corresponds to the standby operating current which it can obtain via the resistors 16 and 17 from the vehicle network, for instance because a certain control power must be delivered to the switch. The electronic lock 4 connected to one igniting line 6 is therefore not directly fed from the other igniting line 5. Instead, it receives its operating current from an energy store in the form of the capacitor 19 which is continuously charged by the igniting line 5 via a decoupling component, preferably a diode 18 polarized in the forward direction.

The diode 18 prevents the capacitor 19 from discharging via the igniter 2 in the event of faulty switching of the switch 3, i.e., prevents the capacitively stored energy from triggering the igniter 2. In addition, the thus effected reverse isolation of the supply input 11 with respect to the igniting line 5 still ensures a temporary power supply for the electronic lock 4 and the control input of the switch 3 from the capacitor 19 in all conditions, especially when, for example due to an accident, the vehicle network has already collapsed and the control circuit 10 can therefore only be operated from the charge of a corresponding storage capacitor contained in it, from which charge then the igniting power may also be obtained. However, this function can also be fulfilled to an adequate extent if the diode 18 is replaced by a resistor which is suitably designed in dependence on the resistors 16 and 17, on the operating voltage of the control circuit 10 and on the static quiescent current requirement of the electronic lock 4 and the capacity of the capacitor 19.

In the second way of supplying power to the electronic lock 4, the resistor 16 is omitted. It is then provided that the control circuit 10 sends out, in the case of activation, that is to say after the closing of the switch 14, a "longer" voltage pulse before the serial pulse code 9 is sent out. As a result, the capacitor 19 is charged up until the beginning of the pulse code 9A to such an extent that it can provide the operating energy long enough for the subsequent decoding of the igniting signal and for actuating the switch 3.

In the third way of providing operating power to the electronic lock 4, the igniting device 1A is also supplied with an alternating voltage in the standby mode. This is possible because the diode 18 rectifies the alternating voltage and thus in every case always provides a direct voltage across the capacitor 19 as the operating voltage for the electronic lock 4. For this purpose, at least one of the resistors 16 and 17 which apply a low quiescent operating current to the device can, in principle, also be replaced by a capacitor. Via such a capacitor, the igniting device 1A is then supplied, instead of the operating voltage $+U_b$, from a special alternating-current/voltage source (a component, not shown, of the control circuit 10) at least with quiescent operating power, optionally having the same or a frequency differing from the ignition triggering frequency.

The present invention also comprises monolithically constructing and integrating the controlled switch 3 and the electronic lock 4 and possibly also the diode 18 on a common semiconductor chip and integrating the semiconductor chip at a very short distance from the igniter 2. In certain embodiments, the semiconductor chip and the igniter 2 are integrated. The invention further comprises using a special connection of such a semiconductor chip, for example, in the form of a bonding wire of suitable characteristics and suitably guided and connected to inflammable material or supported in inflammable material, as a fusible conductor of the igniter 2. The invention also comprises directly integrating a semiconductor chip or at least its bonded wiring with an ignitable substance in a suitable manner to form an electronic safety igniting device 1A having only two connecting lines 5 and 6.

The invention also comprises constructing the electronic lock 4, in particular of an igniting device having an independent line-conducted or not line-conducted actuatability by means of an igniting and unlocking signal in such a manner that an igniting signal 9B can open the electronic switch 3 only during a relatively short defined period after receiving an unlocking signal 9X and no longer thereafter. This further increases safety with respect to mistriggerings.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Igniter device for activation of a protective device in a vehicle in response to an igniting signal from an ignition triggering circuit comprising at least a first switching element actuatable to close in response to a desired activation of said protective device, to generate said igniting signal providing an igniting current indicative of said desired actuation, said igniter device comprising:

a pyro-electric igniting element which contains a fusible conductor that can be heated by current flow, and an inflammable material which is in thermal contact with the fusible conductor;

a second switching element having a control input and a normally open current conducting circuit, said current conducting circuit being connected in series with said fusible conductor and said first switching element, said second switching element being actuatable in response to receipt of a control signal at said control input, to close said current conducting circuit at least by the time said igniting signal has been generated by said ignition triggering circuit, whereby said igniting current can flow from said first switching element to said fusible conductor;

an electronic lock having an output connected to said control input of said second switching element, input means for receiving an unlocking signal indicative of desired activation of said protective device, and means for generating said control signal at said output in response to presence of said unlocking signal at said input means;

means for applying said unlocking signal to said electronic lock, indicative of said desired activation of said protective device;

whereby said igniting current can be conducted to said fusible conductor only if said first switching element of said ignition triggering circuit is closed at a time when said unlocking signal has been applied to said input means of said electronic lock and said control signal has caused said second switching element to close said current conducting circuit in response to said control signal;

wherein said electronic lock has means for permanently storing information defining a particular characteristic or pattern of a time variable signal, and wherein said control signal is generated at said electronic lock output when a characteristic or pattern of said unlocking signal corresponds substantially to said particular characteristic or pattern of said time variable signal defined by said permanently stored information.

2. Igniting device according to claim 1, wherein the unlocking signal is transmitted to the electronic lock independently of the igniting signal provided for activating the fusible conductor of the igniting element.

3. Igniting device according to claim 2, wherein the unlocking signal is transmitted line-conducted to the electronic lock.

4. Igniting device of claim 3, wherein said unlocking signal is transmitted in the form of one of: light and high frequency radio waves.

5. Igniting device according to claim 2, wherein the unlocking signal is transmitted not line-conducted to the electronic lock.

6. Igniting device according to claim 5, wherein the unlocking signal is transmitted in the form of one of: free electromagnetic waves and a sound impulse having predetermined parameters.

7. Igniting device according to claim 1, wherein the input means of the electronic lock is electrically connected to an input of the igniting device, and both the unlocking signal and the igniting signal are transmittable via said second switching element to the pyro-electric igniting element.

8. Igniting device according to claim 7, wherein the unlocking signal comprises a serial bit pattern and the permanently stored information is a digital work which corresponds to said serial bit pattern.

9. Igniting device according to claim 8, wherein the igniting signal comprises at least one pulse which adjoins the serial bit pattern representing the unlocking signal.

10. Igniting device according to claim 1, wherein the unlocking signal comprises a serial bit pattern and the permanently stored information is a digital word which corresponds to said serial bit pattern.

11. Igniting device according to claim 1, wherein the unlocking signal is characterized by periodic oscillations having a predetermined period duration, and the permanently stored information is a time measure corresponding to said period duration.

12. Igniting device according to claim 11, wherein both the unlocking signal and the igniting signal comprise at least one of an alternating voltage and an alternating current which, at least until said current conducting circuit of said second switching element is closed, is characterized by a period of oscillation which substantially corresponds to a time measure stored in the electronic lock.

13. Igniting device according to claim 7, wherein the unlocking signal comprises a series of pulses having a predetermine time interval between said pulses, and the permanently stored information is a time measure corresponding to said predetermined time interval between pulses.

14. Igniting device according to claim 7, wherein the unlocking signal comprises a series of pulses having a predetermine duration, and the permanently stored information is a time measure corresponding to said predetermined duration.

15. Igniting device according to claim 1, wherein the unlocking signal comprises a series of pulses having a predetermined time interval between pulses, and the permanently stored information is a time measure corresponding to said predetermined time interval between pulses.

16. Igniting device according to claim 1, wherein the unlocking signal comprises a series of pulses having a predetermined duration, and the permanently stored information is a time measure corresponding to said predetermined duration.

17. Igniting device according to claim 1, wherein the igniting device has a separate electric connection for supplying operating current to the electronic lock.

18. Igniting device according to claim 1, wherein the electronic lock has supply terminals, and wherein the igniting device has only two electric igniting connections and further comprises a series circuit, connected between the two igniting connections, said series circuit including a capacitor and a decoupling component, the capacitor being connected in parallel with said supply terminals of the electronic lock.

19. Igniting device according to claim 18, wherein the decoupling component is one of: a diode and a resistor.

20. Igniting device according to claim 19, wherein the said second switching element, said electronic lock and said decoupling component are incorporated in a monolithic circuit.

21. Igniting device according to claim 1, wherein the electronic lock is an integrated CMOS circuit and said second switching element is a semi-conductor switch.

22. Igniting device according to claim 21, wherein the semi-conductor switch is one of a bipolar transistor, a field-effect transistor, and a thyristor.

23. Igniting device according to claim 1, wherein said pyro-electro igniting element, said second switching element, said electronic lock and said means for applying an unlocking signal are arranged in close proximity whereby only one end of the fusible conductor of the igniting element is electrically accessible.

24. Igniting device according to claim 1, wherein said pyro-electric igniting element, said second switching element, said electronic lock and said means for applying an unlocking signal are accommodated in a common igniting body.

25. Igniting device according to claim 20, wherein the fusible conductor is a loop of a bonding conductor which is in contact with the monolithic circuit and is in good thermal contact with the inflammable material.

26. Igniting device according to claim 1, wherein said second switching element is held in a closed state only for a defined time after reception of the unlocking signal.

* * * * *